Figure 1:
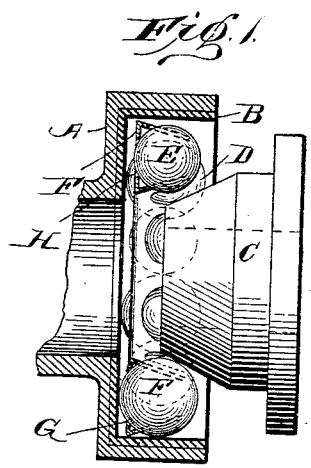

No. 623,327. Patented Apr. 18, 1899.
F. E. MATHEWSON.
BALL BEARING.
(Application filed Feb. 8, 1899.)
(No Model.)

Witnesses:
J. M. Fowler Jr.
Edgar B. McBath

Inventor:
Frank E. Mathewson,
by Wiles & Crane,
Attorneys.

UNITED STATES PATENT OFFICE.

FRANK E. MATHEWSON, OF CHICOPEE, MASSACHUSETTS, ASSIGNOR TO THE LAMB MANUFACTURING COMPANY, OF SAME PLACE.

BALL-BEARING.

SPECIFICATION forming part of Letters Patent No. 623,327, dated April 18, 1899.

Application filed February 8, 1899. Serial No. 704,884. (No model.)

*To all whom it may concern:*

Be it known that I, FRANK E. MATHEWSON, a citizen of the United States, residing at Chicopee, in the county of Hampden and State of Massachusetts, have invented certain new and useful Improvements in Ball-Bearings; and I do hereby declare the following to be a full, clear, and exact description of the invention, such as will enable others skilled in the art to which it appertains to make and use the same.

In ordinary ball-bearings—such, for example, as are used in bicycles—each ball in an annular series is urged to rotate in one direction by its race and at the same time is urged to rotate in the reverse direction by the two adjacent balls of the series. Obviously it must slip on the race or on the balls, or on both, and if all the slipping be upon the balls the total is the same as for four rotations of the ball while in contact with one fixed ball. It needs no argument to show that both loss of power and wear are important. If the bearing-balls of an annular series alternate with smaller balls not in contact with the race, the evils mentioned are eliminated, for any three consecutive balls then act like three engaging gears in that the middle one tends to transmit to the third the motion of the first. With such a compound series it is necessary that the smaller balls should be held in proper alinement by devices that do not prevent the series from traveling onward as a whole in the annular race.

In bearings made in accordance with my invention the large and small balls thus alternate and the smaller ones are supported solely by the larger ones and are at all times held with their centers in the circle passing through the centers of the others. To thus support and hold the smaller balls, I provide a thin annular plate of such internal and external diameter that it may rotate freely in the race and perforate it to form a central seat for each of the large balls to be used, the perforations being of such size that the balls project through the plate without being able to pass through bodily. If the large balls be seated in these perforations, respectively, they will form an annular series accurately spaced and in the same plane. A smaller ball is now placed in each space between the larger ones, and all are then secured against movement away from the plate by a device (one form being hereinafter fully described) carried by the plate and not interfering with the rotation of any ball upon its own center nor with the contact of the larger balls with the race. The proportions must be such that while each small ball touches the adjacent larger balls and rests against the plate the centers of all the balls are in the same plane. That these conditions may be fulfilled when comparatively large intermediate balls are used the plate may be cut away beneath the small balls as well as the larger ones, and this case has been chosen for illustration. A convenient way of holding the balls against the plate is to form the latter as the bottom of an annular trough having convergent sides cut away at proper points so that the larger balls may rest against the race-surfaces.

Figure 2:
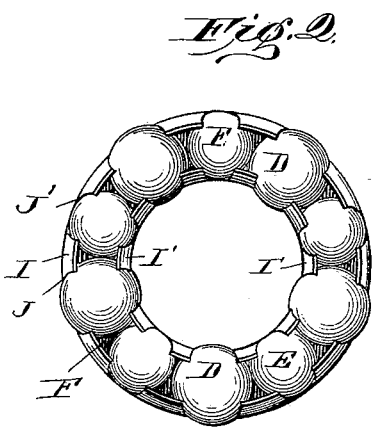
Figure 3:
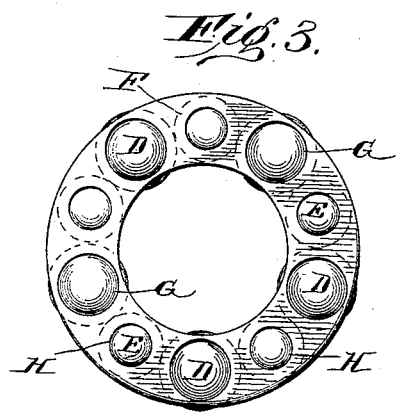

In the drawings, Figure 1 is a partial axial section of the bearing as arranged in one end of an ordinary bicycle-hub. Fig. 2 shows the whole circle of the bearing, looking from the right in Fig. 1, the cone being removed. Fig. 3 shows the same bearing, looking from the left in Fig. 1, the race-cup being omitted.

In the views, A represents a portion of a hub; B, a ball-race; C, a bearing-cone; D, bearing-balls arranged in spaced annular series; E, smaller intermediate balls, and F a perforated annular plate loose within the race and determining the relative positions in which the balls are to remain. The perforations G in the plate correspond in number and relative position with the larger balls and are of such size that the balls when lying therein respectively project through the plate to rest against the bottom of the race, but cannot pass through bodily. The plate is further provided with smaller intermediate perforations H, forming seats for the smaller balls, each of which when in place touches the two adjacent larger balls and has its center in both the plane and the circle passing through the centers of the large balls. For holding all the balls in their seats the plate is formed as the bottom of a trough, whose convergent side walls, which are annular marginal flanges on the plate, extend beyond the plane of the ball-centers. These walls of the trough or flanges at the edges of the plate are selected to illustrate the hereinbefore-mentioned "devices carried by the plate" and securing the balls "against movement away from the plate." The free edges of these sides I I' are cut away or notched at J J' on lines radial with respect to the plate and passing through the centers of the balls, respectively, and these notches extend inward beyond the plane of the ball-centers, but preferably not to the bottom of the trough. The distance between the sides and the size of the notches are such that the larger balls project through the outer wall to rest against the side wall of the race B and are also left exposed on the side next the cone C, and the width and inclination of the sides I I' are such that at least one of them shall overhang both the larger and smaller balls, so that none of them can move away from the plate or bottom of the trough. The balls are placed in position by springing or bending slightly the sides I I', and one or all may be removed in like manner. When all are in place, it is evident that the larger balls support both the plate and the smaller balls, that the plate rotates freely with the balls as the latter travel around in the race, and that the trough, being attached to nothing and touching nothing but the balls, can afford only very slight resistance to the individual movements of the balls about their centers. It is further plain that the parts of the trough left intact in cutting away the bottom and sides are precisely the angular parts that afford greater resistance to distortion than could the same amount of metal in any other portion of the structure. As shown, the apertures in the trough are circular; but this is not essential, and as various changes in details may be made without passing the proper limits of my invention I wish to claim the latter broadly as well as specifically.

What I claim is—

1. The combination with an annular plate provided with spaced perforations, of balls seated in the perforations, respectively, and projecting through the plate, smaller balls resting against the plate, filling the spaces between the larger balls, respectively, and having their centers in the plane of the centers of the larger balls, and devices carried by the plate and preventing the balls from moving away from the latter.

2. For holding an annular series of alternating large and small balls with all their centers in one plane, a circular plate having alternating large and small perforations to serve as seats for the balls, respectively, and devices, borne by the plate, holding the balls in said seats.

3. The combination with an annular plate provided with spaced perforations and having marginal converging notched flanges forming with the plate an annular trough, of balls whose diameter exceeds both the width and depth of the trough seated in said perforations and projecting through both the plate and one of the notched flanges.

4. The combination with the annular plate having alternating large and small perforations and provided with converging marginal flanges notched above the plate, in registration with said perforations, of balls, of a diameter exceeding the depth or width of the trough formed by the plate and flanges, seated in the larger perforations, respectively, and projecting through the plate and the notches in the outer flange, and smaller balls of a diameter exceeding the distance between the free edges of the flanges, seated in the smaller perforations, respectively, and filling the spaces between consecutive larger balls.

5. In ball-bearings, for holding an annular series of alternating large and small balls, an annular trough, with converging side walls, having its bottom provided with alternating large and small perforations and the free margins of its side walls notched in the radial planes passing through the centers of said perforations, respectively.

FRANK E. MATHEWSON.

Witnesses:
C. J. WETSEL,
W. M. ALDEN.